United States Patent [19]

Iwakiri et al.

[11] Patent Number: 5,342,914
[45] Date of Patent: Aug. 30, 1994

[54] CURABLE COMPOSITION

[75] Inventors: Hiroshi Iwakiri; Masayuki Fujita; Takashi Hasegawa, all of Hyogo, Japan

[73] Assignee: Kanegafuchi Kagaku Kogyo Kabushiki Kaisha, Osaka, Japan

[21] Appl. No.: 43,865

[22] Filed: Apr. 7, 1993

[30] Foreign Application Priority Data

Apr. 8, 1992 [JP] Japan .................................. 4-114319

[51] Int. Cl.$^5$ ............................................. C08G 77/20
[52] U.S. Cl. ....................................... 528/32; 525/403; 528/25; 528/30; 528/31; 528/34; 528/38; 528/40; 528/41
[58] Field of Search ..................... 525/403; 528/25, 31, 528/30, 38, 40, 41, 32, 34

[56] References Cited

U.S. PATENT DOCUMENTS 4,963,626 10/1990 Hirose et al. .
4,983,700 1/1991 Yukimoto et al. ................. 525/403

FOREIGN PATENT DOCUMENTS 0345802 12/1989 European Pat. Off. .
0345805 12/1989 European Pat. Off. .
0431173A1 6/1991 European Pat. Off. .

Primary Examiner—Melvyn I. Marquis
Attorney, Agent, or Firm—Armstrong, Westerman, Hattori, McLeland & Naughton

[57] ABSTRACT

A curable composition comprising an oxyalkylene polymer having a silicon-containing hydrolyzable group and a low-molecular silicon compound having a hydrolyzable group bonded to a silicon atom which is more reactive to $H_2O$ than the oxyalkylene polymer, with the mole number of the total hydrolyzable groups in said low-molecular silicon compound being not more than that of the hydrolyzable groups in said oxyalkylene polymer. A sealing compound having well-balanced storage stability and rapid curability is provided.

3 Claims, No Drawings

CURABLE COMPOSITION

FIELD OF THE INVENTION

This invention relates to a curable composition and, more particularly to a curable composition which provides a one-component type sealing compound excellent in storage stability and curability.

BACKGROUND OF THE INVENTION

Where an organic polymer having a silicon-containing hydrolyzable group is used as a one-component curable composition, it is known that the storage stability of the composition can be improved by addition of a low-molecular silicon compound having a silicon-containing hydrolyzable group which exhibits higher reactivity to $H_2O$ than the silicon-containing hydrolyzable group of the organic polymer.

The amount of the low-molecular silicon compound to be added for assurance of storage stability has conventionally been decided only by the $H_2O$ content in the composition. However, when the conventional composition is actually used, the low-molecular silicon compound remaining in the composition adversely affects the curing properties of the composition. For example, curing is retarded, or a cured product becomes too hard.

SUMMARY OF THE INVENTION

An object of the present invention is to provide a curable composition having storage stability while retaining rapid curability by controlling the amount of a residual low molecular silicon compound with respect to the silicon-containing hydrolyzable group (hereinafter referred to as a reactive silicon group) of an organic polymer.

The above object of the present invention is accomplished by a one-component curable composition essentially comprising an oxyalkylene polymer having a reactive silicon group, in which the composition contains a low-molecular silicon compound having a hydrolyzable group bonded to a silicon atom which is more reactive to $H_2O$ than the oxyalkylene polymer, with the mole number of the total hydrolyzable groups in the low-molecular silicon compound being not more than that of the hydrolyzable groups in the oxyalkylene polymer.

According to the present invention, a curable composition exhibiting storage stability and rapid curability in good balance can be obtained.

DETAILED DESCRIPTION OF THE INVENTION

While not limiting, the reactive silicon group in the oxyalkylene polymer which can be used in the present invention typically includes those represented by formula (I):

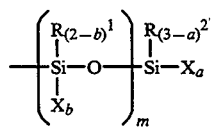

(I)

wherein $R^1$ and $R^2$, which may be the same or different, each represents an alkyl group having from 1 to 20 carbon atoms, an aryl group having from 6 to 20 carbon atoms, an aralkyl group having from 7 to 20 carbon atoms or a tri-organosiloxy group $(R^3)_3SiO-$, wherein three $R^3$ groups, which may be the same or different, each represents a monovalent hydrocarbon group having from 1 to 20 carbon atoms; X, which may be the same or different, each represents a hydrolyzable group; a is 0, 1, 2, or 3; b is 0, 1 or 2; m is 0 or an integer of from 1 to 19, provided that $1 \leq a + mb$; and the numbers b in $-[Si(R^{2-b})(X_b)-O-]_m-$ do not need to be the same.

The hydrolyzable group as represented by X in formula (I) is not particularly limited and includes a hydrogen atom, a halogen atom, an alkoxy group, an acyloxy group, a ketoximate group, an amino group, an amide group, an acid amide group, an amino-oxy group, a mercapto group, and an alkenyloxy group. Among them, a hydrogen atom, an alkoxy group, an acyloxy group, a ketoximate group, an amino group, an amide group, an amino-oxy group, a mercapto group, and an alkenyloxy group are preferred. In particular, an alkoxy group, e.g., a methoxy group, is preferred because of its mild hydrolyzability and ease in handling.

In the reactive silicon group of formula (I), one silicon atom may have 1 to 3 hydrolyzable groups, and (a+mb) is preferably 1 to 5. Two or more hydrolyzable groups per reactive silicon group may be the same or different.

The reactive silicon group may have one or more than one silicon atoms. Where silicon atoms are linked via a siloxane bond, etc., the reactive silicon group may have about 20 silicon atoms.

Of the reactive silicon groups of formula (I), preferred are those represented by formula (II) for their availability:

(II)

wherein $R^2$, X, and a are as defined above.

Examples of the group as represented by $R^1$ or $R^2$ include an alkyl group, e.g., a methyl group and an ethyl group; a cycloalkyl group, e.g., a cyclohexyl group; an aryl group, e.g., a phenyl group; an aralkyl group, e.g., a benzyl group; and a tri-organosiloxy group represented by $(R^3)_3SiO-$ (wherein $R^3$ is a methyl group or a phenyl group). $R^1$, $R^2$, and $R^3$ is each preferably a methyl group.

For obtaining sufficient curing properties, the average number of the reactive silicon groups per molecule of the oxyalkylene polymer is at least 1, and preferably from 1.1 to 5. If the number of the reactive silicon groups per molecule is less than 1, curing properties are insufficient for providing a cured product with satisfactory rubber-like elasticity.

The reactive silicon group may be present either at the terminal or in the inside of an oxyalkylene polymer molecular chain. In the former case, the composition provides on curing a rubbery cured product having an increased effective amount of network chains of the oxyalkylene polymer component, which exhibits high strength, high elongation, and low elastic modulus.

The oxyalkylene polymer skeleton of the reactive silicon group-containing organic polymer which can be used in the present invention comprises a repeating unit represented by formula (III):

(III)

wherein R represents an alkylene group having from 1 to 4 carbon atoms.

From the standpoint of availability, oxypropylene polymers having a repeating unit represented by formula (IV) are preferred:

—CH(CH$_3$)CH$_2$O— (IV)

The oxypropylene polymer may have a straight chain or branched structure or a mixed structure thereof. While the oxypropylene polymer comprising the repeating unit of formula (IV) may contain other repeating units, the content of the monomer unit of formula (IV) is preferably at least 50% by weight, and more preferably at least 80% by weight.

The reactive silicon group-containing oxyalkylene polymer according to the present invention is preferably prepared by introducing a reactive silicon group into an oxyalkylene polymer having a functional group.

Incorporation of a reactive silicon group into the polymer can be effected by known processes, for example, processes (i) to (iii) described below.

(i) A process comprising reacting an oxyalkylene polymer terminated with a functional group, such as a hydroxyl group, with an organic compound having an active group reactive to the functional group and an unsaturated group, or copolymerizing such an oxyalkylene polymer with an unsaturated group-containing epoxy compound, to obtain an unsaturated group-containing oxyalkylene polymer and reacting the resulting polymer with a hydrogenosilane having a reactive silicon group to conduct hydrosilylation.

(ii) A process comprising reacting an unsaturated group-containing oxyalkylene polymer prepared in the same manner as in process (i) with a compound having a mercapto group and a reactive silicon group.

(iii) A process comprising reacting the above-mentioned oxyalkylene polymer terminated with a functional group, such as a hydroxyl group, an epoxy group or an isocyanate group, (hereinafter referred to as functional group Y$^1$) with a compound having a functional group reactive to functional group Y$^1$ (hereinafter referred to as functional group Y$^2$) and a reactive silicon group.

Illustrative examples of the silicon compound having functional group Y$^2$ are amino-containing silanes, e.g., γ-(2aminoethyl)aminopropyltrimethoxysilane, γ-(2aminoethyl)aminopropylmethyldimethoxysilane, and γ-aminopropyltriethoxysilane; mercapto-containing silanes, e.g., γ-mercaptopropyltrimethoxysilane and γ-mercaptopropylmethyldimethoxysilane; epoxysilanes, e.g., γ-glycidoxypropyltrimethoxysilane and β-(3,4-epoxycyclohexyl)ethyltrimethoxysilane; ethylenically unsaturated group-containing silanes, e.g., vinyltriethoxysilane, γ-methacryloyloxypropyltrimethoxysilane, and γ-acryloyloxypropylmethyldimethoxysilane; chlorine-containing silanes, e.g., γ-chloropropyltrimethoxysilane; isocyanate-containing silanes, e.g., γ-isocyanatopropyltriethoxysilane and γ-isocyanatopropylmethyldimethoxysilane; and hydrogenosilanes, e.g., methyldiethoxysilane.

Of the above-described processes, preferred are process (i) and the process according to process (iii) in which a hydroxyl-terminated polymer and a compound having an isocyanate group and a reactive silicon group are reacted.

The details of the above-mentioned incorporation of a reactive silicon group into a polymer are disclosed in JP-A50-156599 (the term "JP-A" as used herein means an "unexamined published Japanese patent application"), JP-A-54-6096, JP-A-57-126823, JP-A-59-78223, JP-A-55-82123, JP-A-55-131022, JP-A-55-137129, JP-A-62-230822, JP-A-63-83131, JP-A3-47825, JP-A-3-72527, JP-A-3-122152, and U.S. Pat. Nos. 3,632,557, 4,345,053, 4,366,307, and 4,960,844.

The present invention is especially effective for a reactive silicon group-containing organic polymer having a molecular weight of 10,000 or more, in which the reactive silicon group content is low, with a weight average molecular weight (Mn) to number average molecular weight (Mn) ratio, Mw/Mn, which is a parameter of a molecular weight distribution, being not more than 1.5, and preferably not more than 1.3. The molecular weight and Mw/Mn ratio can be measured by gel-permeation chromatography (GPC). Examples of such organic polymers are disclosed in JP-A-3-47825, JP-A-3-72527, and JP-A-3-122152.

In the present invention, the above-mentioned organic polymer is used in combination with a low-molecular silicon compound having a hydrolyzable group bonded to a silicon atom which is more reactive to H$_2$O than the organic polymer.

While both the oxyalkylene polymer and the low-molecular silicon compound in the composition have a hydrolyzable group bonded to a silicon atom, it is required that the hydrolysis of the low-molecular silicon compound proceeds faster than that of the oxyalkylene polymer, and it is desirable that the hydrolysis of the oxyalkylene polymer does not substantially proceed.

The low-molecular silicon compound is selected according to the kind of the oxyalkylene polymer, particularly the kind of the hydrolyzable group thereof and the number of the hydrolyzable groups bonded to one silicon atom. Examples of usable low-molecular silicon compounds include:

1) Si(OC$_2$H$_5$)$_4$, CH$_2$=CHSi(OAc)$_3$ (Ac: acetyl), HSCH$_2$CH$_2$CH$_2$Si(OCH$_3$)$_3$;

2) hydrolyzable silicon compounds shown below;

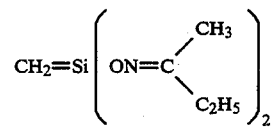

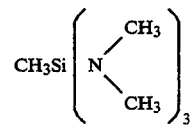

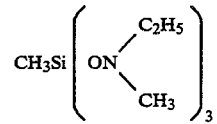

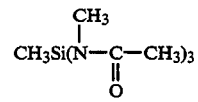

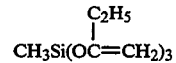

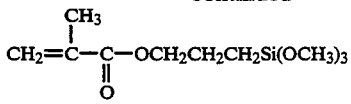

3) epoxysilane compounds shown below;

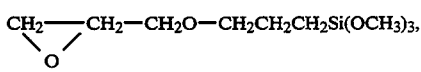

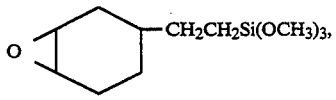

4) amino-substituted alkoxysilanes, e.g.,
H$_2$NCH$_2$CH$_2$NHCH$_2$CH$_2$CH$_2$Si(OCH$_3$)$_3$,
H$_2$NCH$_2$CH$_2$NHCH$_2$CH$_2$CH$_2$Si(CH$_3$)(OCH$_3$)$_2$, and (C$_2$H$_5$O)$_3$-SiCH$_2$CH$_2$CH$_2$NHCH$_2$CH$_2$NHCH$_2$CH$_2$CH$_2$Si(OC$_2$H$_5$)$_3$;

5) aminosilane compounds obtained by reacting the above-mentioned amino-substituted alkoxysilane and the above-mentioned epoxysilane compound; and 6) aminosilane compounds obtained by reacting the above-mentioned amino-substituted alkoxysilane and a methacryloxysilane compound (e.g., CH$_2$=C(CH$_3$)C(O)OCH$_2$CH$_2$CH$_2$Si(OCH$_3$)$_3$ or
CH$_2$=C(CH$_3$)C(O)OCH$_2$CH$_2$CH$_2$Si(OCH$_2$CH$_2$OCH$_2$)$_3$)$_3$.

The hydrolyzable group of the low-molecular silicon compound is preferably an alkoxy group particularly where the hydrolyzable group of the reactive silicon group of the oxyalkylene polymer is an alkoxy group.

If desired, the composition of the present invention may further contain various additives, such as other curing catalysts (e.g., laurylamine and lead octylate), adhesion improving agents, physical properties modifiers, preservability improving agents, ultraviolet absorbing agents, metal-deactivators, antiozonants, photo stabilizers, amine type radical chain terminators, phosphorous peroxide decomposers, lubricants, pigments, and foaming agents.

In the present invention, it is essential that the mole number of the total hydrolyzable groups of the low-molecular silicon compound remaining in the composition should be not more than that of the hydrolyzable groups in the oxyalkylene polymer. Otherwise, the composition has a considerably reduced curing rate.

In order for the effects of the present invention to be taken full advantage of, the H$_2$O content of the composition is preferably not more than 500 ppm, and more preferably not more than 300 ppm. If it exceeds 500 ppm, the composition has reduced storage stability. The H$_2$O content of the composition can be controlled to 500 ppm or less by heating the composition under reduced pressure to physically remove H$_2$O or by utilizing the reaction of the silicon compound whose reactive silicon group has higher reactivity to H$_2$O than the reactive silicon group of the polymer to chemically remove H$_2$0.

The present invention is now illustrated in greater detail with reference to Examples, but it should be understood that the present invention is not construed as being limited thereto. All the parts are by weight unless otherwise indicated.

EXAMPLES 1 TO 3 AND COMPARATIVE EXAMPLES 1 AND 2

A polyoxypropylene polymer carrying a (CH$_3$O)$_2$Si(CH$_3$)CH$_2$CH$_2$CH$_2$- group at 85% of the total terminals thereof and having a number average molecular weight of 10,000 as measured by GPC (hereinafter referred to as polymer A) was used.

GPC for molecular weight measurement was carried out under the following conditions.

| | |
|---|---|
| Apparatus: | High performance GPC apparatus "HLC-8020" manufactured by Toso Co., Ltd. |
| Column: | TSK gel G3000H and G4000H connected in series |
| Solvent: | Tetrahydrofuran; 1.0 ml/min |
| Measuring temperature: | 40.0° C. |
| Sample: | An aliquot weighing 0.05 g dissolved in 10 cc of tetrahydrofuran |

To 100 parts of polymer A were added 120 parts of fatty acid-treated calcium carbonate (average particle size: 0.08 μm), 50 parts of dioctyl phthalate, 20 parts of titanium oxide, 6 parts of hydrogenated castor oil, 1 part of a benzotriazole type ultraviolet absorbent "Tinuvin 327", 1 part of a hindered phenol type antioxidant "NS-6", and 1 part of a hindered amine type photo stabilizer "Sanol LS-770", and the mixture was dehydrated by heating under reduced pressure in a 5 l planetary mixer.

To the mixture was then added vinyltrimethoxysilane in a varied amount to provide the residual silane content shown in Table 1 below, and 1 part of diacetylacetonatodibutyltin was further added thereto as a curing catalyst. After thoroughly stirring, the resulting dispersion was charged in a cartridge to obtain a sealing compound having a varied residual silane content.

Various properties of each of the resulting sealing compounds were determined according to the following test methods. The results obtained are shown in Table 1.

1) Residual Water Content:
   Measured according to Karl Fischer's method.
2) Residual Silane (H$_2$=CHSi(OCH$_3$)$_3$) Content:
   Measured by gas chromatography.
3) Curing Properties:
   The sealing compound was extruded from the cartridge under a condition of 23° C. and 50% RH, and the tack-free time (the time required for the powder components, such as calcium carbonate, to show no tack any more when lightly touched by the finger) was measured.
4) Storage Stability:
   The sealing compound was preserved at 50° C. for 1 month, and the viscosity was measured. A viscosity increase of less than 1.5 times was rated "good", and that of 1.5 times or more "bad".

TABLE 1

| | Example 1 | Example 2 | Example 3 | Compar. Example 1 | Compar. Example 1 |
|---|---|---|---|---|---|
| Residual H$_2$O (ppm) | 230 | 200 | 270 | 320 | 250 |

TABLE 1-continued

| | Example 1 | Example 2 | Example 3 | Compar. Example 1 | Compar. Example 1 |
|---|---|---|---|---|---|
| Residual $CH_2$=$CHSi(OCH_3)_3$ (ppm) | 1080 | 3200 | 4300 | 8100 | 14600 |
| X/Y* | 0.2 | 0.6 | 0.8 | 1.5 | 2.7 |
| Tack-free Time (min) | 70 | 80 | 80 | 140 | 240 |
| Storage Stability (50° C. × 1 month) | good | good | good | good | good |

Note:
*X: Mole number of ≡Si—$OCH_3$ in the residual silicon compound
Y: Mole number of ≡Si—$OCH_3$ in polymer A

EXAMPLES 4 TO 6 AND COMPARATIVE EXAMPLES 3 AND 4

A sealing compound was prepared in the same manner as in Examples 1 to 3, except for replacing polymer A with a polyoxypropylene polymer carrying a $(CH_3O)_2Si(CH_3)CH_2CH_2CH_2$ group at 85% of the total terminals thereof and having a number average molecular weight of 17,000 and a molecular weight distribution (Mw/Mn) of 1.3 as measured by GPC (hereinafter referred to as polymer B) and replacing 1 part of diacetylacetonatodibutyltin with 2 parts of an equimolar reaction product of dibutyltin oxide and dioctyl phthalate. The resulting sealing compound was evaluated in the same manner as in Examples 1 to 3. The results obtained are shown in Table 2.

TABLE 2

| | Example 4 | Example 5 | Example 6 | Compar. Example 3 | Compar. Example 4 |
|---|---|---|---|---|---|
| Residual $H_2O$ (ppm) | 180 | 210 | 200 | 230 | 190 |
| Residual $CH_2$=$CHSi(OCH_3)_3$ (ppm) | 1400 | 2400 | 3800 | 7600 | 11900 |
| X/Y* | 0.3 | 0.5 | 0.8 | 1.6 | 2.5 |
| Tack-free Time (min) | 40 | 50 | 40 | 120 | 190 |
| Storage Stability (50° C. × 1 month) | good | good | good | good | good |

Note:
*X: Mole number of ≡Si—$OCH_3$ in the residual silicon compound
Y: Mole number of ≡Si—$OCH_3$ in polymer B While the invention has been described in detail and with reference to specific examples thereof, it will be apparent to one skilled in the art that various changes and modifications can be made therein without departing from the spirit and scope thereof.

We claim:

1. A curable composition essentially comprising an oxyalkylene polymer having a silicon-containing hydrolyzable group represented by formula:

$$(CH_3O)_2Si(CH_3)CH_2CH_2CH_2-,$$

in which the composition contains a low-molecular silicon compound having a hydrolyzable group bonded to a silicon atom represented by the formula:

$$CH_2=CHSi(OCH_3)_3,$$

which is more reactive to $H_2O$ than the oxyalkylene polymer is, with the mole number of the total hydrolyzable groups in said low-molecular silicon compound being not more than that of the hydrolyzable groups in said oxyalkylene polymer.

2. A curable composition as claimed in claim 1, wherein said oxyalkylene polymer has a number average molecular weight of not less than 10,000 and a weight average molecular weight to number average molecular weight ratio of not more than 1.5.

3. A curable composition as claimed in claim 1, wherein said composition has a water content of not more than 500 ppm.

* * * * *